United States Patent
Li et al.

(10) Patent No.: US 10,268,679 B2
(45) Date of Patent: Apr. 23, 2019

(54) JOINT LANGUAGE UNDERSTANDING AND DIALOGUE MANAGEMENT USING BINARY CLASSIFICATION BASED ON FORWARD AND BACKWARD RECURRENT NEURAL NETWORK

(71) Applicant: Microsoft Technology Licensing, LLC, Redmond, WA (US)

(72) Inventors: Xiujun Li, Tianjin (CN); Paul Anthony Crook, Bellevue, WA (US); Li Deng, Redmond, WA (US); Jianfeng Gao, Woodinville, WA (US); Yun-Nung Chen, Taipei (TW); Xuesong Yang, Urbana, IL (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/368,380

(22) Filed: Dec. 2, 2016

(65) Prior Publication Data
US 2018/0157638 A1    Jun. 7, 2018

(51) Int. Cl.
G10L 15/18 (2013.01)
G06F 17/27 (2006.01)
(Continued)

(52) U.S. Cl.
CPC .............. *G06F 17/279* (2013.01); *G06N 3/08* (2013.01); *G10L 15/063* (2013.01); *G10L 15/22* (2013.01);
(Continued)

(58) Field of Classification Search
CPC ........................... G10L 15/1822; G10L 15/18
(Continued)

(56) References Cited

U.S. PATENT DOCUMENTS 5,794,204 A    8/1998   Miyazawa et al.
6,829,603 B1  12/2004   Chai et al.
(Continued)

FOREIGN PATENT DOCUMENTS

WO    WO2007134402    11/2007

OTHER PUBLICATIONS

Gregoire et al. ("Investigation of Recurrent-Neural-Network Architectures and Learning Methods for Spoken Language Understanding", Interspeech 2013).*

(Continued)

*Primary Examiner* — Farzad Kazeminezhad
(74) *Attorney, Agent, or Firm* — Merchant & Gould

(57) ABSTRACT

A processing unit can operate an end-to-end recurrent neural network (RNN) with limited contextual dialog memory that can be jointly trained by supervised signals-user slot tagging, intent prediction and/or system action prediction. The end-to-end RNN, or joint model has shown advantages over separate models for natural language understanding (NLU) and dialog management and can capture expressive feature representations beyond conventional aggregation of slot tags and intents, to mitigate effects of noisy output from NLU. The joint model can apply a supervised signal from system actions to refine the NLU model. By back-propagating errors associated with system action prediction to the NLU model, the joint model can use machine learning to predict user intent by a binary classification obtained by both forward and backward output, and perform slot tagging, and make system action predictions based on user input, e.g., utterances across a number of domains.

18 Claims, 6 Drawing Sheets

(51) Int. Cl.
*G10L 25/30* (2013.01)
*G06N 3/08* (2006.01)
*G10L 15/06* (2013.01)
*G10L 15/22* (2006.01)

(52) U.S. Cl.
CPC .............. *G10L 25/30* (2013.01); *G10L 15/18* (2013.01); *G10L 15/1822* (2013.01)

(58) Field of Classification Search
USPC ........................................................ 704/257
See application file for complete search history.

(56) References Cited

U.S. PATENT DOCUMENTS

| | | | |
|---|---|---|---|
| 8,719,015 B2 | 5/2014 | Jang et al. | |
| 9,263,036 B1 | 2/2016 | Graves | |
| 9,324,321 B2 | 4/2016 | Xue et al. | |
| 9,406,292 B2 | 8/2016 | Tur | |
| 2003/0204394 A1* | 10/2003 | Garudadri | G10L 15/02 704/201 |
| 2006/0074670 A1 | 4/2006 | Weng et al. | |
| 2014/0278355 A1 | 9/2014 | Sarikaya et al. | |
| 2015/0066496 A1 | 3/2015 | Deoras et al. | |
| 2015/0161101 A1 | 6/2015 | Yao et al. | |
| 2015/0332670 A1 | 11/2015 | Akbacak et al. | |
| 2016/0098988 A1* | 4/2016 | Goussard | G10L 15/18 704/257 |
| 2017/0053646 A1* | 2/2017 | Watanabe | G10L 15/1822 |

OTHER PUBLICATIONS

Anderling, et al., "Dialogue modeling using recurrent neural networks", In Master's Thesis in Computer Science, Jun. 13, 2016, 61 pages.

Liu, et al., "Joint Online Spoken Language Understanding and Language Modeling with Recurrent Neural Networks", In Journal of Computing Research Repository, Sep. 2016, 9 pages.

Yao, et al., "Attention with Intention for a Neural Network Conversation Model", In Journal of the Computing Research Repository, Oct. 2015, pp. 1-7.

Hakkani-Tur, et al., "Multi-Domain Joint Semantic Frame Parsing Using Bi-Directional RNN-LSTM", In Interspeech, Sep. 8, 2016, pp. 715-719.

"International Search Report and Written Opinion Issued in PCT Application No. PCT/US2017/063217", dated Feb. 8, 2018, 12 Pages.

Yang, et al., "End-to-End Joint Learning of Natural Language Understanding and Dialogue Manager", In IEEE International Conference on Acoustics, Speech and Signal Processing, Mar. 5, 2017, pp. 5690-5694.

* cited by examiner

JOINT LANGUAGE UNDERSTANDING AND DIALOGUE MANAGEMENT USING BINARY CLASSIFICATION BASED ON FORWARD AND BACKWARD RECURRENT NEURAL NETWORK

BACKGROUND

Traditionally natural language understanding (NLU) models operate independently from dialogue models and output from the NLU model was simply provided to the dialogue model in a pipeline fashion. Such a conventional approach is sensitive to errors from the NLU model.

In the last decade, natural language understanding and dialogue management have taken on increased importance due to incorporation of conversational systems, e.g., digital assistants in various devices. The goal of conversational systems is to enable users to provide natural language input to a conversational system, which the conversational system can use to assist the user in completing tasks more efficiently. A typical pipeline of tasks in traditional conversational systems is to use an NLU model to parse user utterances into semantic frames to capture meaning. Typically, the first task in the NLU model is to decide the domain given the input utterance, and based on the domain, the second task is to predict the intent, and then the third task is to fill associated slots corresponding to a domain-specific semantic template. The next step in the pipeline is passing the output from the NLU model to a separate dialogue manager (DM) model. In the DM model, the task is to monitor belief distribution over possible user states underlying current user behaviors, and based on the belief distribution to predict system actions.

Such traditional approaches have several disadvantages. Traditional approaches for NLU usually model tasks of domain/intent classification and slot filling separately and employ sequential labeling methods, e.g. hidden Markov models (HMMs) and conditional random field (CRF) are widely used in slot tagging tasks; maximum entropy and support vector machines with linear kernel (LinearSVM) are often applied to user intent prediction. These models rely on careful feature engineering that is laborious and time consuming. Applying deep learning techniques, recurrent neural networks and CRF modeling has improved expressive feature representations in NLU modeling, and convolutional neural networks have improved domain/intent classification. However, even though slot tags and intents, as semantics representations of user behaviors, may share knowledge with each other, separate modeling of these two tasks is typically constrained to take full advantage of all supervised signals.

Furthermore, information flows from NLU to DM, such that noisy outputs (errors) from the NLU are apt to transfer errors to the following DM, which leads to challenges for monitoring the belief distribution and predicting system actions. The most successful previous approaches cast the DM as a partially Markov decision process, which uses hand-crafted features to represent the state and action space. These existing approaches require a large number of annotated conversations or human interactions. Thus, converting these experimental methods into practice has proven far from trivial, as exact policy learning is computationally intractable. Therefore, these previous approaches are constrained to narrow domains.

Improvement in accuracy and processing speed is important for conversation understanding systems like digital personal assistants, to operate effectively across a wide variety of domains.

SUMMARY

This disclosure describes systems, methods, and computer-executable instructions on computer-readable media for an end-to-end recurrent neural network (RNN) with limited contextual dialogue memory that can be jointly trained by supervised signals—user slot tagging, intent prediction and/or system action prediction (SAP). The end-to-end RNN model described herein has shown advantages over existing separate models for natural language understanding and dialogue management. The joint model described herein can capture highly expressive feature representations beyond conventional aggregation of slot tags and intents, such that the effects of noisy output from NLU can be mitigated. The joint model described herein can apply a supervised signal from SAP to refine the NLU model component. By back-propagating errors associated with SAP to the NLU component, the end-to-end RNN uses machine learning to predict user intent, and perform slot tagging, and make system action predictions based on an input of users, including typed and/or spoken utterances across a wide swath of domains without requiring the hand-crafted features, large number of annotated conversations, or human interactions of previous systems. In various examples, the end-to-end RNN described herein can improve accuracy and processing speed important for conversation understanding systems like digital personal assistants.

This Summary is provided to introduce a selection of concepts in a simplified form that are further described below in the Detailed Description. This Summary is not intended to identify key and/or essential features of the claimed subject matter, nor is it intended to be used as an aid in determining the scope of the claimed subject matter. The term "techniques," for instance, can refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar and/or identical items.

DETAILED DESCRIPTION

Overview

Figure 1:
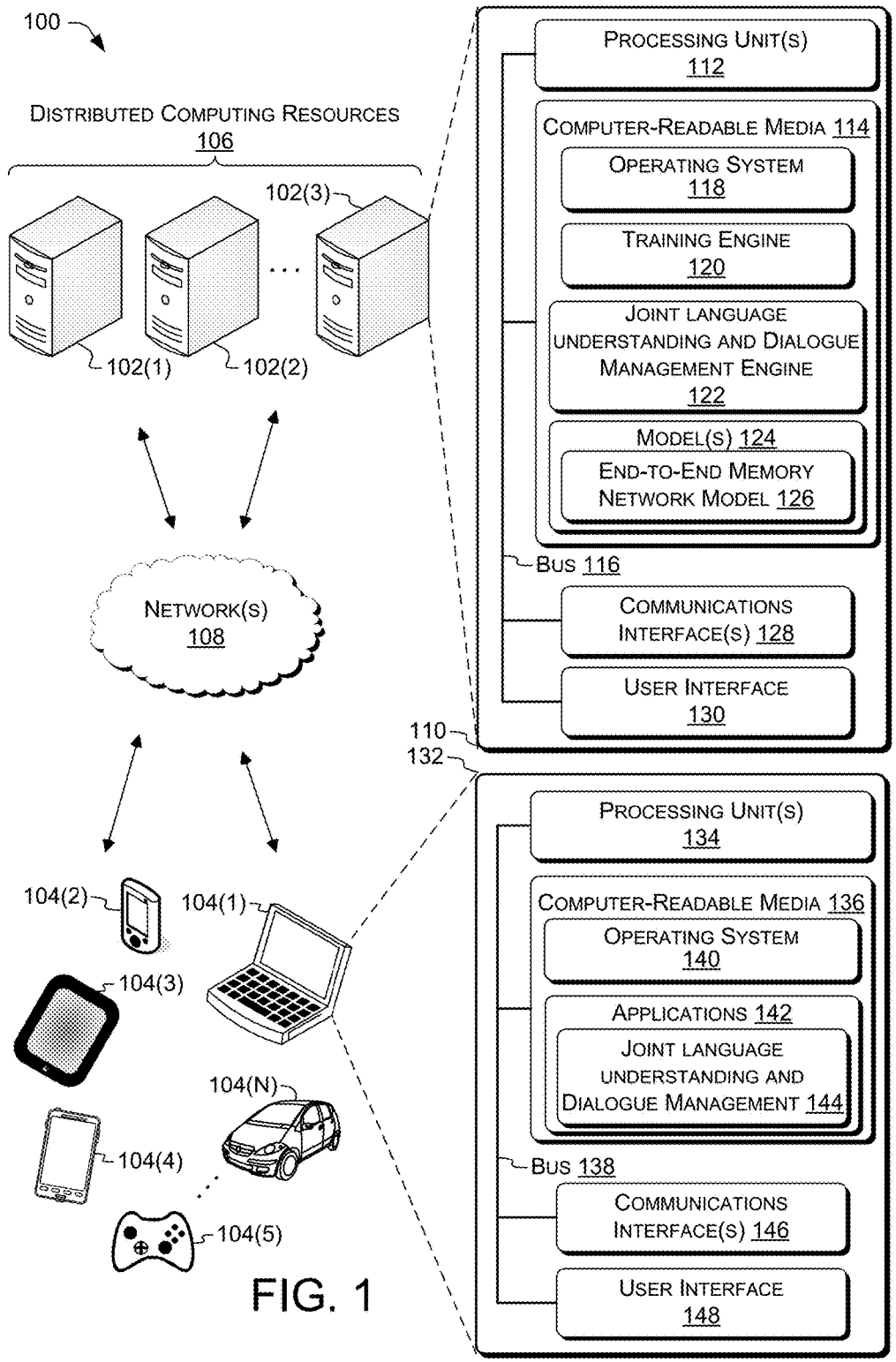
FIG. 1 is a block diagram depicting an example environment for implementing joint language understanding and dialogue management as described herein.

The goal of conversational systems is to enable users to speak to a conversational system, and for the conversational system to predict a correct next system action. Examples described herein provide techniques and constructs to improve the training and operation of computational models, e.g., neural networks such as recursive neural networks, recurrent neural networks (RNNs), etc. In the last decade, a variety of practical, goal-oriented conversation understanding systems have been built for a number of domains, such as search engines, bots, and the digital and/or virtual personal assistants Microsoft Cortana; Apple Siri; Google Now, Allo; Amazon Alexa, Echo, etc.

In at least one example, an end-to-end recurrent neural network (RNN) as described herein can share output of bi-directional long short-term memory including slot tags and intent prediction from a natural language understanding (NLU) component, part, or layer, part, or layer of the end-to-end RNN model with a dialogue management (DM) component, part, or layer, part, or layer of the end-to-end RNN model, can receive contextual history at the NLU component, part, or layer from the DM component, part, or layer, can refine the NLU component, part, or layer based at least on the contextual history, and can perform one-to-many (in some instances one-to-all, multiple one-to-many, and/or multiple one-to-all) binary classification for SAP at an output layer of the end-to-end RNN model. In examples, the contextual history can include errors propagated from the DM component, part, or layer to the NLU component, part, or layer.

In various examples, the end-to-end RNN model includes a plurality of bi-directional long short-term memory (LSTM) cells. Individual bi-directional LSTM cells can be configured to compute a sequence of hidden vectors and output a sequence of vectors according to calculations including a softmax for a vector representation of an input. In some examples, operation of the end-to-end RNN model can include applying element-wise sigmoid functions.

In various examples, an end-to-end recurrent neural network (RNN) as described herein can operate as a combined, e.g., aggregated, concatenated, etc., model with limited contextual dialogue memory, the combined model can limit contextual dialogue memory by combining, e.g., aggregating, concatenating, etc., what previously had been considered at least two separate models, a natural language understanding (NLU) model and a dialogue management (DM) model. Examples can jointly train a NLU component, part, or layer and a DM component, part, or layer on multi-domain human to human dialogues. Examples can train a combined model with supervised signals including system-action-prediction (SAP) signals, and in some instances slot-tagging signals and/or intent-prediction signals. Examples can jointly model NLU and DM in an end-to-end recurrent neural network (RNN) based on output of the NLU component, part, or layer and output of the DM component, part, or layer serving as input to other of the NLU component, part, or layer and the DM component, part, or layer. While the end-to-end RNN can be considered a type of classifier, the end-to-end RNN is more than a typical classifier; the end-to-end RNN is a multi-task learning model that can produce NLU (intents predictions and slot tags) and SAP. For example, given one input, e.g., typed or spoken utterance, the end-to-end RNN can produce a sequence of labels for the input, e.g., in IOB format, from an NLU component, part, or layer, and can produce a single SAP label, or in some instances multiple SAP labels, for the input from a DM component, part, or layer of the end-to-end RNN.

In various examples, the end-to end RNN can include a plurality of bi-directional long short-term memory (LSTM) cells. The bi-directional LSTM cells can be configured to combine, e.g., concatenate, aggregate, etc., forward hidden output and backward output from an input vector and a reverse sequence of the input vector. In some examples, combining the forward hidden output and the backward output from the input vector and the reverse sequence of the input vector can include incorporating bi-directional weight matrices. In some examples, the bi-directional LSTM cells can be configured to compute a sequence of hidden vectors and output a sequence of vectors according to calculations including a softmax for a vector representation of a current input.

In various examples, the NLU can receive as input one or a series of typed or spoken queries and/or utterances; the DM component, part, or layer of the end-to end RNN can receive as input hidden output from the NLU component, part, or layer and/or a history of hidden output from the NLU component, part, or layer, and the DM component, part, or layer can perform classification for system action prediction (SAP) based at least on the hidden output. In some examples, the typed or spoken queries and/or utterances can be the only input received from outside the conversation system and/or the end-to-end RNN. In some examples, the NLU component, part, or layer can receive a sequence of word vectors, and the NLU component, part, or layer can estimate conditional probability to minimize distance between possible outputs for slot tagging and/or perform classification for intent prediction.

In various examples, the DM component, part, or layer of the end-to end RNN can perform binary classification. For example, a sigmoid function can activate neurons of binary classifiers in an output layer of the end-to-end RNN.

Experiments on Dialogue State Tracking Challenge 4 (DSTC4) multi-domain human-human dialogues show that an end-to-end RNN model as described herein significantly outperforms the state-of-the-art pipeline models for both intent prediction and slot tagging as from NLU and SAP as from DM, which indicates that the described joint model is capable of mitigating the effects of noisy NLU outputs, and an NLU model can be refined by error flows back-propagating from the supervised signals of system actions.

At some level, an end-to-end RNN as described herein can be considered as a DM model (which produces SAP) stacked on top of a contextual history of NLU models (which produce intent predictions and slot tags). An NLU model can be designed by sharing bi-directional long short-term memory (biLSTM) layers to perform the tasks of slot tagging and intent prediction.

In at least one example, an end-to-end RNN configured for joint language understanding and dialogue management can operate on the input sequence of word vectors (e.g., user inputs including typed and/or spoken queries and/or utterances) and can produce output in the form of intent prediction, slot tags, and SAP.

Experiments investigated the performance of alternative architectures on DSTC4 data as examples. Compared to previous approaches, e.g., NLU-Baseline and NLU-Pipeline, end-to-end RNN for joint language understanding and dialogue management as described herein, though it sacrifices frame-level accuracy for slot tagging, outperforms alternatives with the best frame-level accuracy for intent prediction and NLU overall in the experimental results. Moreover, compared to previous approaches, e.g., Baseline (CRF+SVM), Pipeline (biLSTM), Oracle (SVM), and Oracle (biLSTM), end-to-end RNN for joint language understanding and dialogue management outperforms the alternatives with the best frame-level accuracy for system action prediction in the experimental results. The experiments demonstrated that the end-to-end RNN for joint language understanding and dialogue management described herein outperforms results from alternative approaches.

As used herein, F1 represents a combined measure of precision and recall, e.g., an average of scores precision and recall. As used herein, semantic parsing represents parsing of an input, be it a verbal utterance or other form of query, to identify parts and/or characteristics of the input. Semantic parsing can include identifying domain and intent of the input, and assigning words of the input to slots, though other terminologies are may be included in semantic parsing as described herein including domain, dialogue, constraint slot, and requested slot, combination of action and requested slot, and equivalents thereof. As used herein domain represents a category identified for an input from semantic parsing. As used herein intent represents the goal of an input for semantic parsing. As defined herein slot represents a constraint for a query or argument for an API for semantic parsing.

As used herein query means an input to multi-domain joint task semantic frame parsing and utterance means a type of sound-based input. As used herein, input can be typed, spoken or sound-based, gestural, touch, etc., and user input means any such input from a user unless a particular type of input is specified.

As used herein intent prediction represents a task of determining an intent of an input for semantic parsing, and slot filling represents assigning constraints for a query or arguments for an API for semantic parsing without limitation for a minimum or maximum number of slots, including zero slots. In the instance of zero slots in a query, location of the device from which the query is received can be treated an inferred location slot.

Some examples use distributed computing resources and/or processing units provisioned as part of a cluster computing system ("computing cluster" or "cluster") having several discrete computing nodes that work together to accomplish a computing task assigned to the cluster as a whole. Some such systems can have all or a portion of the cluster deployed in a distributed manner, aka in the cloud. Distributed or cloud computing allows for computing resources to be provided as services rather than a deliverable product. For example, in a cloud-computing environment, resources such as computing power, software, information, and/or network connectivity are provided (for example, through a rental agreement) over a network, such as the Internet. As used herein, the term "computing" used with reference to computing clusters, nodes, and jobs refers generally to computation, data manipulation, and/or other programmatically-controlled operations. The term "resource" used with reference to clusters, nodes, and jobs refers generally to any commodity and/or service provided by the cluster for use by jobs. Resources can include processor cycles, disk space, random-access memory (RAM) space, network bandwidth (uplink, downlink, or both), prioritized network channels such as those used for communications with quality-of-service (QoS) guarantees, backup tape space and/or mounting/unmounting services, electrical power, etc.

In various examples, e.g., of computational models trained for end-to-end memory network for contextual, e.g., joint language understanding and dialogue management and/or other use cases noted herein, the computational models may include artificial neurons, e.g., as found in multilayer perceptrons and/or other neural networks. A neural network can have none, one or more, or at least two hidden layers. The techniques described herein may include the use of an algorithm to parallelize the training of the RNNs across multiple processing units, e.g., cores of a multi-core processor and/or multiple general-purpose graphics processing units (GPGPUs). Accordingly, multiple layers of RNNs may be processed in parallel on the multiple processing units. Neural networks such as RNNs can be trained with minibatch-based stochastic gradient descent (SGD). Other frameworks besides SGD can be used, e.g., minibatch non-stochastic gradient descent and/or other mathematical-optimization techniques.

In some examples, an RNN can include artificial neurons interconnected so that the output of a first unit can serve as a later input to the first unit and/or to another unit not in the layer immediately following the layer containing the first unit. Examples include Elman networks in which the outputs of hidden-layer artificial neurons are fed back to those neurons via memory cells, and Jordan networks, in which the outputs of output-layer artificial neurons are fed back via the memory cells.

In some examples, algorithms for computational-model training as described herein can be performed on a computing device, such as a smart phone, a tablet, a desktop computer, a server, a server blade, a supercomputer, etc. The resulting models can be used on such computing devices and/or on computing devices having one or more input devices, such as a physical keyboard, a soft keyboard, a touch screen, a touch pad, microphone(s), and/or camera(s).

Various environments, configurations of electronic devices, and methods for training and using computational models, e.g., for control applications, are described further with reference to FIGS. 1-6. While many examples described herein relate to servers and other non-consumer electronic devices, other types of electronic devices can be used, e.g., as discussed with reference to FIG. 1.

Illustrative Environment

FIG. 1 shows an example environment 100 in which examples of computational model training systems, e.g., recurrent neural network (RNN) training systems or multi-model training systems for an end-to-end RNN for joint language understanding and dialogue management, can operate and/or in which methods of end-to-end RNN for joint language understanding and dialogue management such as those described herein can be performed. In the illustrated example, the various devices and/or components illustrated in scenario 100 include computing device(s) 102(1)-102(N) (individually and/or collectively referred to herein with reference 102), where N is any integer greater than and/or equal to 1, e.g., distributed computing resource(s), and computing devices 104(1)-104(K) (individually and/or collectively referred to herein with reference 104), where K is any integer greater than and/or equal to 1. In some examples, N=K; in other examples, N>K or N<K. Although illustrated as, e.g., desktop computers, laptop computers, tablet computers, and/or cellular phones, computing device(s) 102 and/or 104 can include a diverse variety of device categories, classes, and/or types and are not limited to a particular type of device.

In the illustrated example, computing device(s) 102(1)-102(N) can be computing nodes of distributed computing resources 106, e.g., in a computing cluster, such as a cloud service such as MICROSOFT AZURE, VMware vCloud, Rackspace, Inc.'s OpenStack, Amazon Web Services AWS, IBM SmartCloud, Oracle Cloud, etc. In the illustrated example, computing device(s) 104 can be clients of distributed computing resources 106 and can submit jobs to distributed computing resources 106 and/or receive job results from distributed computing resources 106. Computing devices 102(1)-102(N) in distributed computing resources 106 can, e.g., share resources, balance load, increase performance, and/or provide fail-over support and/or redundancy. Computing devices 104 can additionally or alternatively operate in a cluster and/or grouped configuration.

By way of example and not limitation, computing device(s) 102 and/or 104 can include, but are not limited to, server computers and/or blade servers such as Web servers, map/reduce servers and/or other computation engines, and/or network-attached-storage units (e.g., 102(1)), laptop computers, thin clients, terminals, and/or other mobile computers (e.g., 104(1)), wearable computers such as smart watches and/or biometric and/or medical sensors, implanted computing devices such as biometric and/or medical sensors, computer navigation client computing devices, satellite-based navigation system devices including global positioning system (GPS) devices and/or other satellite-based navigation system devices, personal data assistants (PDAs), and/or other specialized portable electronic devices (e.g., 104(2)), tablet computers (e.g., 104(3)), tablet hybrid computers, smartphones, mobile phones, mobile phone-tablet hybrid devices, and/or other telecommunication devices (e.g., 104(4)), sensors and/or other devices or systems for detecting characteristics of an environment, such as thermal, optical, vibratory, pressure, weather, and/or other sensors, portable and/or console-based gaming devices and/or other entertainment devices such as network-enabled televisions, set-top boxes, media players, cameras, and/or personal video recorders (PVRs) (e.g., (e.g., 104(5)), represented graphically as a gamepad), automotive computers such as vehicle control systems, vehicle security systems, and/or electronic keys for vehicles (e.g., 104(N), represented graphically as an automobile), desktop computers, and/or integrated components for inclusion in computing devices, appliances, and/or other computing device(s) configured to participate in and/or carry out computational-model training and/or operation as described herein.

In some examples, as indicated, computing device(s), e.g., computing devices 102 and 104, can intercommunicate to participate in and/or carry out end-to-end RNN training and/or operation as described herein. For example, a computing device 104 can be a query and/or data source and computing device 102 can be a computational-model training system, as described below with reference to, e.g., FIGS. 2-6.

Different devices and/or types of computing devices 102 and 104 can have different needs and/or ways of interacting with distributed computing resources 106. For example, computing devices 104 can interact with distributed computing resources distributed computing resources 106 with discrete request/response communications, e.g., for responses and/or updates using an already-trained model. Additionally and/or alternatively, computing devices 104 can be query and/or data sources and can interact with distributed computing resources distributed computing resources 106 with discrete and/or ongoing transmissions of data to be used as input to a computational model. This can provide improved accuracy by increasing the number or queries and/or amount of data input to the model. Additionally and/or alternatively, computing devices 104 can be data sinks and can interact with distributed computing resources 106 with discrete and/or ongoing requests for data output from a computational model.

In some examples, computing devices 102 and/or 104 can communicate with each other and/or with other computing devices via one or more network(s) 108. In some examples, computing devices 102 and 104 can communicate with external devices via network(s) 108. For example, network(s) 108 can include public networks such as the Internet, private networks such as an institutional and/or personal intranet, and/or combination(s) of private and public networks. Private networks can include isolated networks not connected with other networks, such as MODBUS, FIELDBUS, and/or Industrial Ethernet networks, etc. Private networks can also include networks connected to the Internet and/or other public network(s) via network address translation (NAT) devices, firewalls, network intrusion detection systems, and/or other devices that restrict and/or control the types of network packets permitted to flow between the private network and the public network(s).

Network(s) 108 can also include any type of wired and/or wireless network, including but not limited to local area networks (LANs), wide area networks (WANs), satellite networks, cable networks, Wi-Fi networks, WiMAX networks, mobile communications networks (e.g., 3G, 4G, and so forth) and/or any combination thereof. Network(s) 108 can utilize communications protocols, such as, for example, packet-based and/or datagram-based protocols such as Internet Protocol (IP), Transmission Control Protocol (TCP), User Datagram Protocol (UDP), other types of protocols, and/or combinations thereof. Moreover, network(s) 108 can also include a number of devices that facilitate network communications and/or form a hardware infrastructure for the networks, such as switches, routers, gateways, access points, firewalls, base stations, repeaters, backbone devices, and the like. Network(s) 108 can also include devices that facilitate communications between computing devices 102 and/or 104 using bus protocols of various topologies, e.g., crossbar switches, INFINIBAND switches, and/or FIBRE CHANNEL switches and/or hubs.

In some examples, network(s) 108 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), other standards, e.g., BLUETOOTH, cellular-telephony standards such as GSM, LTE, and/or WiMAX.

Different networks have different characteristics, e.g., bandwidth, latency, accessibility (open, announced but secured, and/or not announced), and/or coverage area. The type of network 108 used for any given connection between, e.g., a computing device 104 and distributed computing resources 106 can be selected based on these characteristics and on the type of interaction.

Still referring to the example of FIG. 1, details of an example computing device 102(3) are illustrated at inset 110. The details of example computing device 102(3) can be representative of others of computing device(s) 102. However, each of the computing device(s) 102 can include additional or alternative hardware and/or software components. The illustrated computing device 102 can include one or more processing unit(s) 112 operably connected to one or more computer-readable media 114, e.g., memories, such as via a bus 116, which in some instances can include one or more of a system bus, a data bus, an address bus, a Peripheral Component Interconnect (PCI) Express (PCIe) bus, a PCI bus, a Mini-PCI bus, and any variety of local, peripheral, and/or independent buses, and/or any combination thereof. In some examples, plural processing unit(s) 112 can exchange data through an internal interface bus (e.g., PCIe), rather than and/or in addition to network 108. While the processing unit(s) 112 are described as residing on the computing device 102(3), in this example, the processing unit(s) 112 can also reside on different computing device(s) 102 and/or 104 in some examples. In some examples, at least two of the processing unit(s) 112 can reside on different computing device(s) 102 and/or 104. In such examples, multiple processing unit(s) 112 on the same computing device 102 and/or 104 can use a bus 116 of the computing device 102 and/or 104 to exchange data, while processing unit(s) 112 on different computing device(s) 102 and/or 104 can exchange data via network(s) 108.

Computer-readable media described herein, e.g., computer-readable media 114, includes computer storage media and/or communication media. Computer storage media includes tangible storage units such as volatile memory, nonvolatile memory, and/or other persistent and/or auxiliary computer storage media, removable and non-removable computer storage media implemented in any method and/or technology for storage of information such as computer-readable instructions, data structures, program modules, and/or other data. Computer storage media includes tangible and/or physical forms of media included in a device and/or hardware component that is part of a device and/or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards and/or other optical storage media, magnetic cassettes, magnetic tape, magnetic disk storage, magnetic cards and/or other magnetic storage devices and/or media, solid-state memory devices, storage arrays, network attached storage, storage area networks, hosted computer storage and/or memories, storage, devices, and/or storage media that can be used to store and maintain information for access by a computing device 102 and/or 104.

In contrast to computer storage media, communication media can embody computer-readable instructions, data structures, program modules, and/or other data in a modulated data signal, such as a carrier wave, and/or other transmission mechanism. As defined herein, computer storage media does not include communication media.

In some examples, computer-readable media 114 can store instructions executable by the processing unit(s) 112 that, as discussed above, can represent a processing unit incorporated in computing device 102. Computer-readable media 114 can additionally and/or alternatively store instructions executable by external processing units such as by an external central processing unit (CPU) and/or external processor of any type discussed herein. In some examples at least one processing unit 114, e.g., a CPU, graphics processing unit (GPU), and/or hardware logic device, can be incorporated in computing device 102, while in some examples at least one processing unit 114, e.g., one or more of a CPU, GPU, and/or hardware logic device, can be external to computing device 102.

Computer-readable media 114 can store, for example, computer-executable instructions of an operating system 118, module(s) of a training engine 120, module(s) of a joint language understanding and dialogue management engine 122, and/or other modules, programs, and/or applications that are loadable and executable by processing unit(s) 112. In some examples not shown, one or more of the processing unit(s) 112 in one of the computing device(s) 102 and/or 104 can be operably connected to computer-readable media 114 in a different one of the computing device(s) 102 and/or 104, e.g., via communications interface and network 108. For example, program code to perform steps of flow diagrams herein, e.g., as described herein with reference to joint language understanding and dialogue management engine 122, can be downloaded from a computing device 102 operating as a server to a computing device 104 operating as a client, e.g., via the network 108, and executed by one or more processing unit(s) in computing device 104. For example, the computer-executable instructions stored on the computer-readable media 114 can upon execution configure a computer such as a computing device 102 and/or 104 to perform operations described herein with reference to the operating system 118, the training engine 120, and/or the joint language understanding and dialogue management engine 122.

Computer-readable media 114 can also store, for example, one or more computational model(s) 124, individually and/or collectively referred to herein with reference 124. The computational model(s) 124 include, e.g., one or more recurrent neural networks (RNNs) e.g., an end-to-end RNN model 126. As noted above, the computational models 124 can include, e.g., activation weights, functions, and/or thresholds (collectively "parameters") for artificial neurons and/or other computational units (e.g., LSTM units, biLSTM units, etc.) of one or more neural networks. The training engine 120 and/or the joint language understanding and dialogue management engine 122 can determine values of parameters computational models 124 and can use the determined parameters values of computational model 124 to perform data analysis and/or processing.

Processing unit(s) 112 can be and/or include one or more single-core processors, multi-core processors, CPUs, GPUs, GPGPUs, and/or hardware logic components configured, e.g., via specialized programming from modules and/or APIs, to perform functions described herein. For example, and without limitation, illustrative types of hardware logic components that can be used in and/or as processing unit(s) 112 include Field-Programmable Gate Arrays (FPGAs), Application-Specific Integrated Circuits (ASICs), Application-Specific Standard Products (ASSPs), System-on-a-Ship systems (SOCs), Complex Programmable Logic Devices (CPLDs), Digital Signal Processors (DSPs), and other types of customizable processors. For example, a processing unit 114 can represent a hybrid device, such as a device from ALTERA and/or XILINX that includes a CPU core embedded in an FPGA fabric. These and/or other hardware logic components can operate independently and/or, in some instances, can be driven by a CPU. In some examples, at least some of computing device(s) 102 and/or 104 can include a plurality of processing unit(s) 112 of multiple types. For example, the processing unit(s) 112 shown in computing device 102(3) can be a combination of one or more CPUs, GPGPUs, FPGAs, etc. Different processing unit(s) 112 can have different execution models, e.g., as is the case for graphics processing units (GPUs) and central processing unit (CPUs).

Computing device 102 can also include one or more communications interfaces 128 connected via the bus 116 to processing unit(s) 112 to enable wired and/or wireless communications between computing device(s) 102 and other networked computing devices 102 and/or 104 involved in end-to-end memory network for contextual, e.g., multi-turn, language understanding, and/or other computing device(s), e.g., over network(s) 108. Such communications interface(s) 128 can include one or more transceiver devices, e.g., network interface controllers (NICs) such as Ethernet NICs and/or other types of transceiver devices, to send and receive communications over a network. The processing unit(s) 112 can exchange data through respective communications interface(s) 128. In some examples, the communications interface 128 can include a PCI Express (PCIe) transceiver, and the network 108 can include a PCIe bus. In some examples, the communications interface 128 can include, but is not limited to, a transceiver for cellular (3G, 4G, and/or other), WI-FI, Ultra-wideband (UWB), BLUETOOTH, and/or satellite transmissions. The communications interface 128 can include a wired I/O interface, such as an Ethernet interface, a serial interface, a Universal Serial Bus (USB) interface, an INFINIBAND interface, and/or other wired interfaces. The communications interface 128 can additionally and/or alternatively include one or more user-interface devices, buses such as memory buses and/or local buses, memory interfaces, and/or hardwired interfaces such as 0-20 mA control lines. For simplicity, these and other components are omitted from the illustrated computing device 102(3).

As noted above, computer-readable media 114 of the computing device 102 can store an operating system 118. In some examples, an operating system 118 is not used (commonly referred to as a "bare metal" configuration). In some examples, the operating system 118 can include components that enable and/or direct the computing device 102 to receive data via various inputs (e.g., user controls, network and/or communications interfaces, memory devices, and/or sensors), and process the data using the processing unit(s) 112 to generate output. The operating system 118 can further include one or more components that present the output (e.g., display an image on an electronic display, store data in memory, and/or transmit data to another computing device). The operating system 118 can enable a user, e.g., an engineer, to interact with the computing device 102 using a user interface. Additionally, the operating system 118 can include components that perform various functions generally associated with an operating system 118, e.g., storage management and internal-device management.

In some examples, computing device 102 can include a user interface 130 configured to permit a user, e.g., an engineer responsible for computing device 102(3), distributed computing resources 106, environment 100 and/or a neural-network administrator, to operate the training engine 120, the joint language understanding and dialogue management engine 122, and/or the model(s) 124 including the end-to-end memory network model 126.

Details of an example computing device 104(1) are illustrated at inset 132. The details of example computing device 104(1) can be representative of others of computing device(s) 104. However, each of the computing device(s) 104 can include additional and/or alternative hardware and/or software components. Computing device 104(1) can include one or more processing unit(s) 134 operably connected to one or more computer-readable media 136, e.g., via a bus 138. Some examples of processing unit(s) 134 are discussed above with reference to processing unit(s) 112. Some examples of computer-readable media 136 are discussed above with reference to computer-readable media 114. For example, computer-readable media 136 can include one or more computer storage media or communications media. Some examples of bus 138 are discussed above with reference to bus 116.

Computer-readable media 136 can store, for example, computer-executable instructions of an operating system 140, and/or other modules, programs, and/or applications 142 that are loadable and executable by processing unit(s) 134. Other applications in applications 142 can be operable with or optimized for contextual, e.g., joint language understanding and dialogue management, such as application 144, which can represent a digital and/or virtual personal assistant, a search engine, a bot, etc. Some examples of operating system 140 are discussed above with reference to inset 110.

In some examples, the computing device 104 can be configured to communicate with distributed computing resources 106 and/or computing device(s) 102 to operate an end-to-end memory network model 126 and/or other computational model 124. For example, the computing device 104 can transmit a request to distributed computing resources 106 and/or computing device(s) 102 for an output of the end-to-end memory network model 126 and/or other computational model(s) 124, receive a response, and take action based on that response. In some examples, functions described herein can be shared between one or more computing device(s) 102 and one or more computing device(s) 104. For example, the computing device(s) 104 can operate an input layer of one or more neural network(s) and the distributed computing resources 106 and/or computing device(s) 102 can operate one or more hidden layers and/or output layers of one or more neural network(s).

Computing device 104 can also include one or more communications interfaces 146 connected via the bus 138 to processing unit(s) 134 to enable wired and/or wireless communications between computing device(s) 104 distributed computing resources 106 and/or and other networked computing devices 102 and/or 104 involved in end-to-end RNN for joint language understanding and dialogue management, and/or other computing device(s), over network(s) 108. Some examples are discussed above with reference to communications interface(s) 128.

In some examples, computing device 104 can include a user interface 148. For example, computing device 104(4) can provide user interface 148 to control and/or otherwise interact with distributed computing resources 106 and/or computing devices 102. For example, processing unit(s) 134 can receive inputs e.g., typed and/or spoken queries and/or user utterances and/or other input actions via user interface 148 and transmit corresponding data via communications interface(s) 146 to computing device(s) 102.

User interface 130 and/or 148 can include one or more input devices, integral and/or peripheral to computing device 102 and/or 104. The input devices can be user-operable, and/or can be configured for input from other computing device 102 and/or 104. Examples of input devices can include, e.g., a keyboard, keypad, a mouse, a trackball, a pen sensor and/or smart pen, a light pen and/or light gun, a game controller such as a joystick and/or game pad, a voice input device such as a microphone, voice-recognition device, and/or speech-recognition device, a touch input device such as a touchscreen, a gestural and/or motion input device such as a depth camera, a grip sensor, an accelerometer, another haptic input, a visual input device such as one or more cameras and/or image sensors, and the like. User interfaces 130 and/or 148 can include one or more output devices configured for communication to a user and/or to another computing device 102 and/or 104. Output devices can be integral and/or peripheral to computing device 102 and/or 104. Examples of output devices can include a display, a printer, audio speakers, beepers, and/or other audio output devices, a vibration motor, linear vibrator, and/or other haptic output device, and the like.

Illustrative Components

Figure 2:
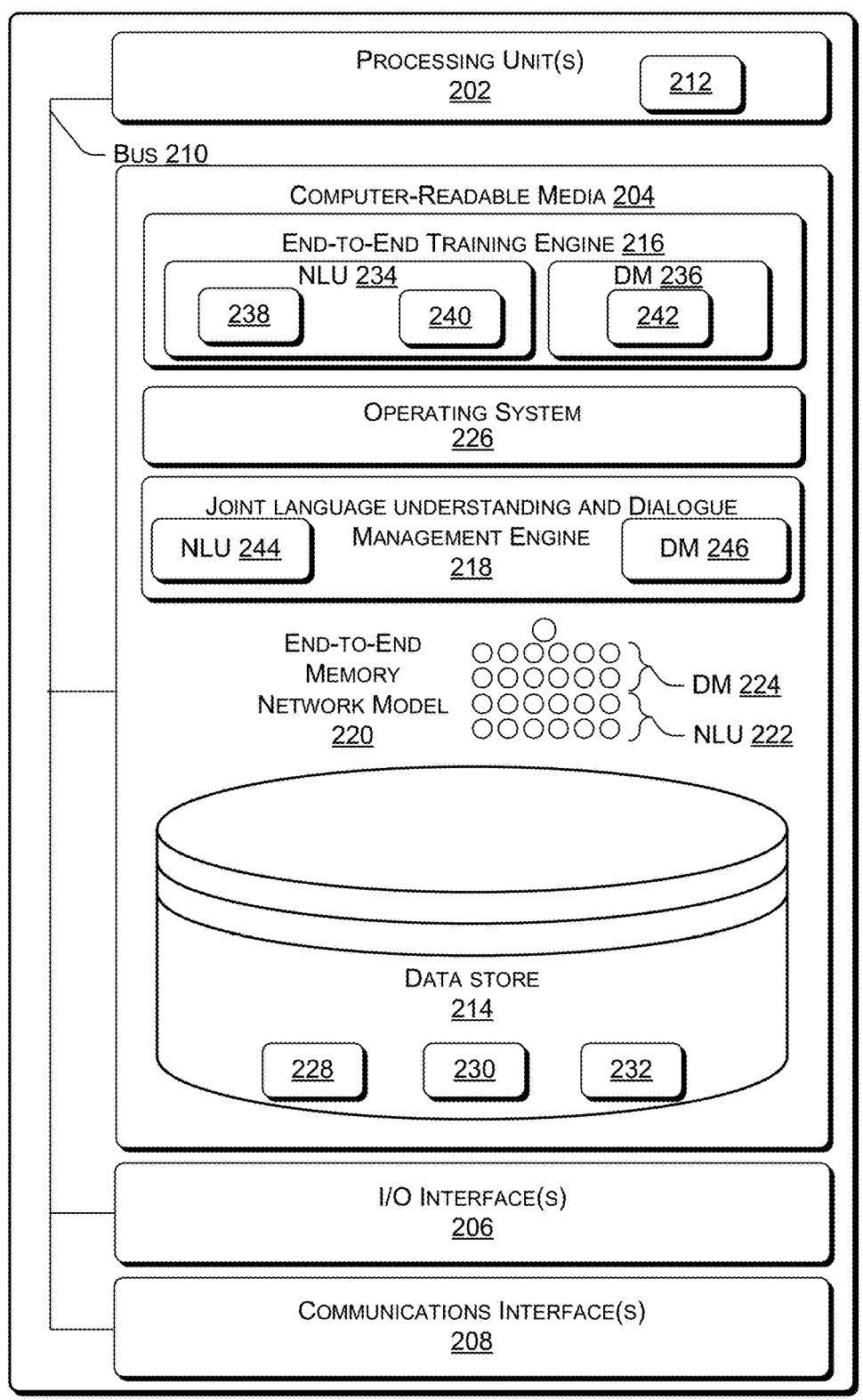
FIG. 2 is a block diagram depicting an example computing device configured to participate in training and operation of computational models for joint language understanding and dialogue management according to various examples described herein.

FIG. 2 is an illustrative diagram that shows example components of an computing device 200, which can represent computing device(s) 102 and/or 104, and which can be and/or implement an RNN training and/or operation system, device, and/or apparatus, according to various examples described herein. Example computing device 200 includes one or more processing unit(s) 202, computer-readable media 204, input/output interface(s) 206, and network interface(s) 208. The components of computing device 200 are operatively connected, for example, via a bus 210. These components can represent corresponding components from device(s) 102 *a*, e.g., processing unit(s) 202 can represent processing unit(s) 112, bus 210 can represent bus 116, etc.

In example computing device 200, processing unit(s) 202 may correspond to processing unit(s) 122, and can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc. In some examples, processing unit(s) 202 can include and/or be connected to a memory 212, e.g., a RAM and/or cache.

Computer-readable media 204 may correspond to computer-readable media 124, and can store instructions executable by the processing unit(s) 202. Computer-readable media 204 can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in computing device 200, while in some examples one or more of a CPU, GPU, and/or accelerator is external to computing device 200.

Computer-readable media 204 can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Input/output (I/O) interfaces 206 allow computing device 200 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like).

Network interface(s) 208, which can represent communications interface(s) 128, can represent, for example, network interface controllers (NICs) or other types of transceiver devices to send and receive communications over a network.

In the illustrated example, computer-readable media 204 includes a data store 214. In some examples, data store 214 includes data storage such as a database, data warehouse, or other type of structured or unstructured data storage. In some examples, data store 214 includes a corpus and/or a relational database with one or more tables, indices, stored procedures, and so forth to enable data access including one or more of hypertext markup language (HTML) tables, resource description framework (RDF) tables, web ontology language (OWL) tables, and/or extensible markup language (XML) tables, for example. Data store 214 can store data for the operations of processes, applications, components, and/or modules stored in computer-readable media 204 and/or executed by processing unit(s) 202 and/or accelerator(s).

Computing device 200 can implement an end-to-end training engine 216, which generally performs training offline and can represent training engine 120, FIG. 1. In some examples, end-to-end training engine 216 operates on initial input, e.g., typed and/or spoken queries and/or utterances. Computing device 200 can implement a joint language understanding and dialogue management engine 218, which generally operates online and can represent joint language understanding and dialogue management engine 122, FIG. 1. In some examples, end-to-end training engine 216 operates on initial input, and joint language understanding and dialogue management engine 122 operates on ongoing input. Computing device 200 can implement an end-to-end memory network model 220, which is generally updated incrementally and can represent end-to-end memory network model 126, FIG. 1. Computing device 200 can include and/or be included in a system and/or device for training and/or operating a neural network and/or other computational model as described herein.

In some examples, computer-readable media 204 of the computing device 200 can represent computer-readable media 114, FIG. 1, and can store a plurality of modules of the training engine 216, the joint language understanding and dialogue management engine 218, and/or the end-to-end memory network model 220. In various examples, the end-to-end memory network model 220 can be configured to have NLU layer 222 of nodes or neurons and/or DM layer 224 of nodes or neurons as part of the model based on updates of the end-to-end memory network model 220. Processing unit(s) 202 can be configured to execute modules of the plurality of modules. For example, the computer-executable instructions stored on the computer-readable media 204 can upon execution configure a computer such as a computing device 200 to perform operations described herein with reference to the modules of the plurality of modules. The modules stored in the computer-readable media 204 can include instructions that, when executed by the one or more processing units 202, cause the one or more processing units 202 to perform operations described below. Examples of modules in computer-readable media 204 are discussed below. Computer-readable media 204 can also include an operating system 226, which can represent operating system 118, e.g., as discussed above.

In the illustrated example, computer-readable media 204 includes a data store 214. In some examples, data store 214 can include data storage, structured and/or unstructured, such as a database (e.g., a Structured Query Language, SQL, and/or NoSQL database) and/or data warehouse. In some examples, data store 214 can include a corpus and/or a relational database with one or more tables, arrays, indices, stored procedures, and so forth to enable data access. Data store 214 can store data for the operations of processes, applications, components, and/or modules stored in computer-readable media 204 and/or computer instructions in those modules executed by processing unit(s) 202. In some examples, the data store can store computer program instructions 228 (e.g., instructions corresponding to processes described herein and/or to other software executable by processing unit(s) 202), one or more computational models 230, which can represent computational models 126, FIG. 1, training data 232, e.g., datasets, to be used for training and/or operation of the computational models 230, metadata, e.g., of data domains (discussed below), database schema(s), and/or any combination thereof.

Computing device 200 can exchange data with computing devices 102 and/or 104 (e.g., laptops, computers, and/or servers) via one or more network(s) 108, such as the Internet. In some examples, computing device 200 can receive data from one or more data source(s) (not shown) via one or more network(s) 108. Example data source(s) can include computing devices 102 and/or 104, sensors, data aggregators, and/or data feeds, e.g., via application programming interfaces (APIs). The processing units 202 can retrieve data from the data source(s), e.g., via an HTTP request such as a GET to a Web Services and/or Representational State Transfer (REST) API endpoint.

In some examples, the processing unit(s) 202 can access the module(s) on the computer-readable media 204 via bus 210, which can represent bus 116, FIG. 1. I/O interface 206 and communications interface 208 can also communicate with processing unit(s) 202 via bus 210.

The modules of the end-to-end training engine 216 stored on computer-readable media 204 can include one or more modules, e.g., shell modules and/or API modules, for training neural networks such as RNN, LSTM, LSTM-LA, biLSTM, GRU, etc. As shown in the illustrated example, end-to-end training engine 216 can include an NLU component, part, or layer 234 and DM component, part, or layer 236. That is, training engine 216 can include components to produce user slot tags 238 and intent predictions 240 as output, such as from NLU, and SAP 242 as output, such as from DM.

The modules of the joint language understanding and dialogue management engine 218 stored on computer-readable media 204 can include one or more modules, e.g., shell modules and/or API modules, for operating neural networks such as end-to-end RNN, RNN, LSTM, LSTM-LA, biLSTM, GRU, etc. Joint language understanding and dialogue management engine 218 can include an NLU component, part, or layer 244 and DM component, part, or layer 246. That is, joint language understanding and dialogue management engine 218 can include components to produce user slot tags 238 and intent predictions 240 as output, such as from NLU, and SAP 242, such as from DM.

In the training engine 216 and/or the joint language understanding and dialogue management engine 218, the number of modules can vary higher and/or lower, and modules of various types can be used in various combinations. For example, functionality described associated with the illustrated modules can be combined to be performed by a fewer number of modules and/or APIs and/or can be split and performed by a larger number of modules and/or APIs.

Figure 3:
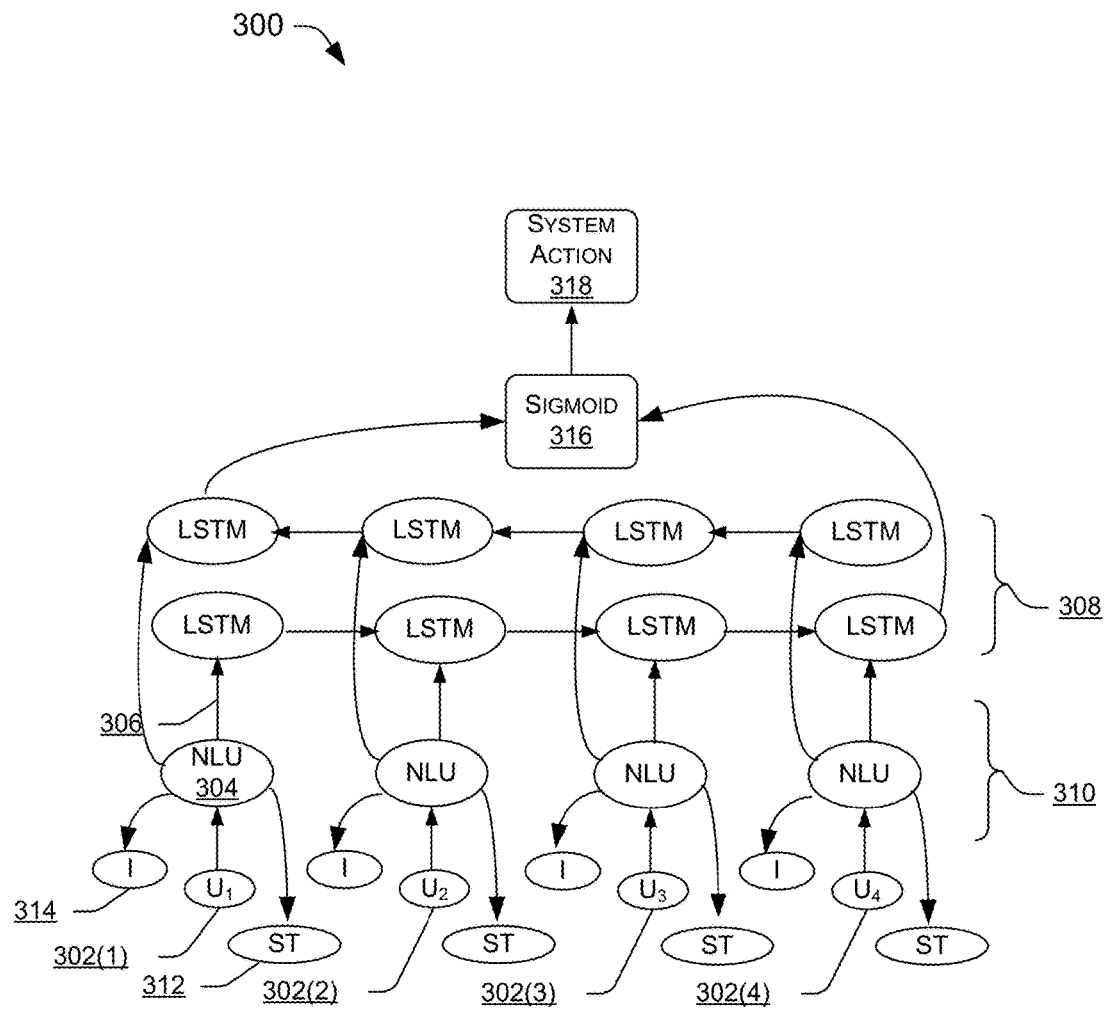
FIG. 3 illustrates an example end-to-end RNN for joint language understanding and dialogue management, according to various examples described herein.
Figure 4:
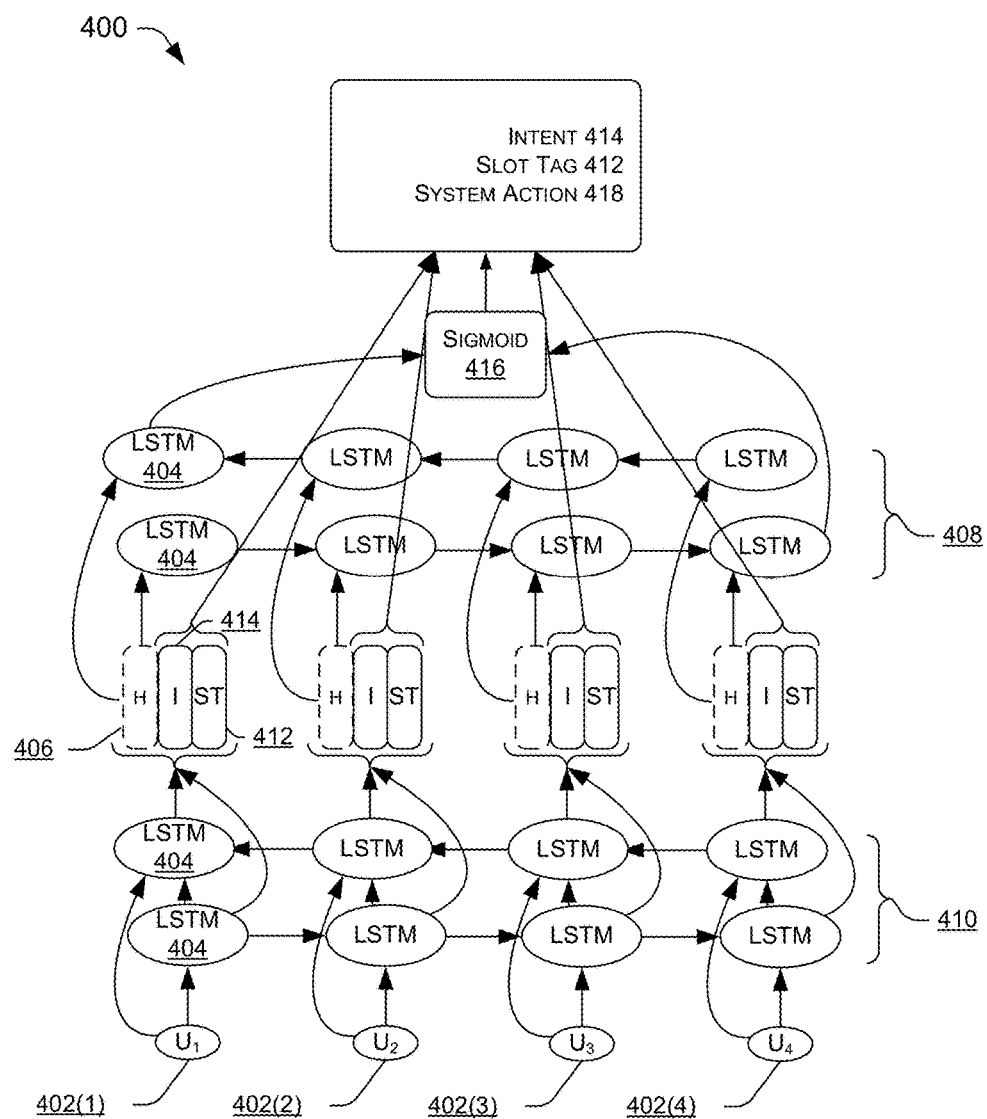
FIG. 4 illustrates an example end-to-end RNN for joint language understanding and dialogue management according to various examples described herein.

FIG. 3 illustrates an example end-to-end RNN for joint language understanding and dialogue management, according to various examples described herein. FIG. 4 depicts an alternate representation of an example end-to-end RNN for joint language understanding and dialogue management according to various examples described herein.

The models 300 and/or 400, e.g., model 220, can receive a sequence of input, e.g., typed and/or spoken queries and/or utterances, e.g., input vectors $K=\{x_i\}_1^T$ 302(1)-302(N), 402(1)-402(N), (individually and/or collectively referred to herein with references 302 or 402, respectively), where N is any integer greater than and/or equal to 1 at a recurrent unit H, e.g., a node or neuron 304(1)-304(N), 404(1)-404(N), (individually and/or collectively referred to herein with references 304 or 404, respectively), where N is any integer greater than and/or equal to 1. (Duplicative reference numerals are omitted from FIGS. 3 and 4 for simplicity.) The models 300 and/or 400, e.g., model 220, can compute a sequence of hidden vectors, and output a sequence $y=\{y_t\}_1^T$, 306(1)-306(N), 406(1)-406(N), (individually and/or collectively referred to herein with references 306 or 406, respectively), where N is any integer greater than and/or equal to 1, by iterating the following equations 1 and 2:

$$h_t = \mathcal{H}(x_t, h_{t-1}) = \sigma(W_{xh}x_t + U_{hh}h_{t-1}) \tag{1}$$

$$\hat{y}_t = \arg\max(\text{softmax}(W_{hy}h_t)) \tag{2}$$

where an activation function can include softmax$(z_m) = e^{z_m}/\Sigma_i e^{z_i}$, $\sigma$, and $W_{xh}$, $U_{hh}$, and $W_{hy}$, can represent example weight matrices. A goal of a sequence-to-sequence model is to estimate conditional probability $p(y|x) = \Pi_{t=1}^T p(y_t|x)$ such that distance between two distributions $p(\hat{y}_t|x)$ and $q(y_t|x)$ can be minimized according to equation 3, $$\text{loss} = -\sum_{t=1}^T \sum_{z=1}^M q(y_t = z | x) \log p(\hat{y}_t = z | x) \tag{3}$$

where M denotes the size of output label set.

Engines 216 and/or 218 can train such sequential models using backpropagation. For example, LSTM, e.g., LSTM, bi-directional LSTM (biLSTM), etc., cells can be used as recurrent units, nodes, or neurons H 304, 404 because LSTM can mitigate problems of vanishing or exploding gradients in long-term dependencies via self-regularization. The recurrent unit can be further expanded as shown in equations 4-7, $$h_t = \mathcal{H}(x_t, h_{t-1}) = o_t \circ \tan h(c_t) \quad (4)$$

$$c_t = f_t \circ c_{t-1} + i_t \circ g_t \quad (5)$$

$$o_t = sigm(W_{xo}x_t + U_{ho}h_{t-1}), i_t = sigm(W_{xi}x_t + U_{hi}h_{t-1}) \quad (6)$$

$$f_t = sigm(W_{xf}x_t + U_{hf}h_{t-1}), g_t = \tan h(W_{xg}x_t + U_{hg}h_{t-1}) \quad (7)$$

where the sigmoid functions sigm and tan h are applied element-wise, and denotes an element-wise product. Since preceding and following lexical contexts can be informative in analysis of user input, e.g., typed and/or spoken queries and/or utterances, bi-directional LSTM cells (biLSTM) are used in various examples so that sequence x and its reverse sequence go through LSTM layer individually, and their forward hidden output $\overrightarrow{h}$ and backward output $\overleftarrow{h}$ can be concatenated together as shown in equations 8 and 9:

$$\overrightarrow{h}_t = \mathcal{H}(x_t, \overrightarrow{h}_{t-1}), \overleftarrow{h}_t = \mathcal{H}(x_t, \overleftarrow{h}_{t+1}) \quad (8)$$

$$\hat{y}_t = \arg\max(softmax(\overrightarrow{W}_{hy}\overrightarrow{h}_t + \overleftarrow{W}_{hy}\overleftarrow{h}_t)) \quad (9)$$

where $\overrightarrow{W}_{hy}$ and $\overleftarrow{W}_{hy}$ represent bi-directional weight matrices.

End-to-end memory network model 300 or 400, e.g., 220, e.g., an end-to-end RNN, can be considered an RNN classifier as a DM component, part, or layer 308, 408, e.g., 224 uses bi-directional LSTM cells that $\mathcal{H}$ takes as inputs a history of hidden outputs $h^{(nlu)} = \{h_i^{(nlu)}\}_1^I$ from NLU units, nodes, or neurons in an NLU component, part, or layer 310, 410, e.g., 222, and performs one-to-many, in some instances one-to-all, multiple one-to-many, and/or multiple one-to-all, binary classifications for system action prediction at the output layer. This can be mathematically represented according to equations 10-12:

$$\overrightarrow{h}_i^{(act)} = \mathcal{H}(h_i^{(nlu)}, \overrightarrow{h}_{i-1}^{(act)}), \overleftarrow{h}_i^{(act)} = \mathcal{H}(h_i^{(nlu)}, \overleftarrow{h}_{i+1}^{(act)}) \quad (10)$$

$$p^{(act)} = sigm(\overrightarrow{W}_{hy}^{(act)}\overrightarrow{h}_I^{(act)} + \overleftarrow{W}_{hy}^{(act)}\overleftarrow{h}_I^{(act)}) \quad (11)$$

$$\hat{y}_k^{(act)} = \begin{cases} 1, & p_k^{(act)} \geq threshold \\ 0, & otherwise \end{cases} \quad (12)$$

where $k \in [1, K]$ denotes an index of system action labels.

An NLU component, part, or layer, e.g., 222, 310, 410 of an end-to-end memory network, e.g., RNN, model 220, 300, 400 at a history i can be considered as a multi-task joint model with shared biLSTM layers for the tasks of producing slot tags 312, 412 and predicted intents 314, 414, where the NLU component, part, or layer, e.g., 222, 310, 410 of an end-to-end memory network, e.g., RNN, model 220, 300, 400 can take as inputs a sequence of word vectors $w = \{w_t\}_1^T$, and can perform sequence-to-sequence processing for slot tagging and one-to-many, in some instances one-to-all, multiple one-to-many, and/or multiple one-to-all, binary classifications for intent prediction. The biLSTM architecture discussed above can be directly applied to the slot tagging task, at history i, according to equations 13 and 14:

$$\overrightarrow{h}_t^{1(i)} = H(w_t, \overrightarrow{h}_{t-1}^{1(i)}), \overleftarrow{h}_t^{1(i)} = H(w_t, \overleftarrow{h}_{t+1}^{1(i)}) \quad (13)$$

$$\hat{y}_t^{(tag_i)} = \arg\max(softmax(\overrightarrow{W}_{hy}^{(tag)}\overrightarrow{h}_t^{1(i)} + \overleftarrow{W}_{hy}^{(tag)}\overleftarrow{h}_t^{1(i)})) \quad (14)$$

where $\overrightarrow{h}_t^{1(i)}$ and $\overleftarrow{h}_t^{1(i)}$ can denote the respective shared forward and backward layers, respectively.

In human-human dialogues a number of intents can correspond to a single user input, e.g., typed and/or spoken queries and/or utterance. Models 220, 300, 400 can include another LSTM layer, e.g., LSTM, bi-directional LSTM (biLSTM), etc., in addition to recurrent units $\mathcal{H}$, and can consider the last hidden vector $h_T^{2(int_i)}$ as the output of this LSTM layer—in some instances only considering the last hidden vector as the output, and discarding other output. The output layer can include a set of one-to-many, in some instances one-to-all, multiple one-to-many, and/or multiple one-to-all, binary classifiers, in which each unit, node, or neuron can be activated using a sigmoid function 316, 416. In various examples, a positive system action label 318, 418 can be predicted when the probability is no less than a threshold as set forth in equations 15-17:

$$h_t^{2(int_i)} = \mathcal{H}(h_{t-1}^{2(int_i)}, \overrightarrow{h}_t^{1(i)}, \overleftarrow{h}_t^{1(i)}) \quad (15)$$

$$p^{(int_i)} = sigm(W_{hy}^{2(int)}h_T^{2(int_i)}) \quad (16)$$

$$\hat{y}_n^{(int_i)} = \begin{cases} 1, & p_n^{(int_i)} \geq threshold \\ 0, & otherwise \end{cases} \quad (17)$$

where can denote the index of intent labels 314, 414. In various examples, a similar architecture can calculate hidden vectors 306, 406 according to equation 18.

$$h_t^{(nlu)} = h_T^{2(nlu)}, h_t^{2(nlu_i)} = \mathcal{H}(h_{t-1}^{2(nlu_i)}, \overrightarrow{h}_t^{1(i)}, \overleftarrow{h}_t^{1(i)}) \quad (18)$$

An end-to-end RNN for joint language understanding and dialogue management as described herein can be trained to estimate conditional probability of actions 318, 418, slot tags 312, 412, and intents 314, 414 from a history of word vectors $w = \{w^{(i)}\}_1^t$, such that $loss = l^{(act)} + l^{(tag)} + l^{(int)}$ can be minimized according to respective equations 19-21:

$$l^{(act)} = -\sum_{n=1}^{K}\sum_{z=0}^{1} q(y_n^{(act)} = z \mid w)\log p(\hat{y}_n^{(act)} = z \mid w) \quad (19)$$

$$l^{(tag)} = -\sum_{i=1}^{I}\sum_{t=1}^{T}\sum_{z=1}^{M} q(y_t^{(tag_i)} = z \mid w^{(i)})\log p(\hat{y}_t^{(tag_i)} = z \mid w^{(i)}) \quad (20)$$

$$l^{(int)} = -\sum_{i=1}^{I}\sum_{n=1}^{N}\sum_{z=0}^{1} q(y_n^{(int_i)} = z \mid w^{(i)})\log p(\hat{y}_n^{(int_i)} = z \mid w^{(i)}) \quad (21)$$

where M can denote the size of the set of user slot tags. During training, examples can provide contextual history feedback of supervised signals including of the actions 318, 418, and in some instances slot tags 312, 412, and/or intents 314, 414 that the end-to-end RNN can use to refine the natural language understanding of the joint model.

Experiments described herein were performed on DSTC4 multi-domain human-human dialogues. Table 1 presents information about the data used in the experiments.

TABLE 1

|  | #utters | #words | #tags | #intents | #actions |
|---|---|---|---|---|---|
| train | 5.648 | 2.252 | 87 | 68 | 66 |
| dev | 1.939 | 1.367 | 79 | 54 | 53 |
| test | 3.178 | 1.752 | 75 | 58 | 58 |

In particular, the corpus collected actual human-human dialogues of tourist information for Singapore from Skype calls that spanned five domains—accommodation, attraction, food, shopping, and transportation. In the corpus, interactions of tourists and guides tended to be expressed in a series of multiple turns. In the experiments, queries and comments from the tourists were defined as user input utterances and responses from the guides were defined as system information. Experiments included transforming raw data into examples that fit the parameters of the experiments, e.g., each example includes: a user input, e.g., typed and/or spoken queries and/or utterance, and associated slot tags in in-out-begin (JOB) format, user intents, and system actions as the responses. Labels of system actions were defined as a combination of categories and attributes of speech acts, e.g. QST_WHEN. NULL represented a waiting response from guides when expressed in multiple turns. Consecutive guide actions in response to a single tourist input, e.g., typed and/or spoken queries and/or utterance, were merged as multiple labels. The whole corpus was split into train/dev/test as shown in Table 1. Unseen words, user intents, slot tags, and system actions in the dev/test set were categorized as UNK.

Table 2 presents a report of performance of NLU models in percentages where F1, Precision (P), and Recall (R) are at token level and frame-level accuracy (FrmAcc) is at frame level.

TABLE 2

| Models | User Slot Tagging | | | | User Intent Prediction | | | | NLU |
|---|---|---|---|---|---|---|---|---|---|
| | F1 | Precision | Recall | FrmAcc | F1 | Precision | Recall | FrmAcc | FrmAcc |
| NLU-Baseline | 40.50 | 61.41 | 30.21 | 77.31 | 49.75 | 52.56 | 47.24 | 37.19 | 33.13 |
| NLU-Pipeline | 46.15 | 54.63 | 39.96 | 76.84 | 47.48 | 52.19 | 43.55 | 39.96 | 36.38 |
| NLU-JointModel | 45.04 | 53.35 | 38.97 | 79.49 | 49.67 | 52.22 | 47.35 | 42.20 | 37.38 |

Table 2 provides comparisons of NLU outputs (slot tagging, intent prediction, and frame accuracy) from an end-to-end RNN for joint language understanding and dialogue management as described herein to NLU outputs (slot tagging, intent prediction, and frame accuracy) from two other NLU models, Baseline and Pipeline.

As shown in Table 2, CRF and SVMs NLU-Baseline maintains frame-level accuracy score of 33.13%, biLSTM NLU models from the NLU-pipeline and NLU-JointModel achieve better results with increases of 3.25% and 4.25%, respectively. This indicates that joint training with the tasks of slot filling and intent prediction captures implicit knowledge underlying the shared user input, e.g., typed and/or spoken queries and/or utterances, while another supervised signal from system action prediction can be used to refine the biLSTM based model further by back-propagating the errors associated with the SAP from end-to-end RNN for joint language understanding and dialogue management. Of the models tested, the best accuracy at frame-level for the slot filling task was obtained by a traditional CRF baseline with only lexical features of words, and biLSTM NLU models from the NLU-pipeline and NLU-JointModel fell behind with absolute decreases of 0.47% and 0.82%, respectively. Of the models tested, the best frame accuracy for the task of intent prediction is achieved by NLU-JointModel with a 5.01% improvement compared to NLU-Baseline.

Table 3 presents a report of performance of end-to-end models for system action prediction, where F1, P, and R are micro-averaged numbers at token level and FrmAcc is frame-level accuracy (%).

TABLE 3

| Models | F1 | P | R | FrmAcc |
|---|---|---|---|---|
| Baseline (CRF + SVMs) | 31.15 | 29.92 | 32.48 | 7.71 |
| Pipeline (biLSTMs) | 19.89 | 14.87 | 30.01 | 11.96 |
| JointModel | 19.04 | 18.53 | 19.57 | 22.84 |
| Oracle (SVMs) | 30.61 | 30.20 | 31.04 | 7.65 |
| Oracle (biLSTM) | 23.09 | 22.24 | 24.01 | 19.67 |

Table 3 provides comparisons of an end-to-end RNN for joint language understanding and dialogue management as described herein to a number of other models. Table 3 presents an evaluation of end-to-end models including, Baseline (CRF+SVMs), Pipeline (biLSTMs), Oracle (SVMs), Oracle (biLSTM).

Baseline (CRF+SVMs): Three tasks were trained separately and they were pipelined for testing. CRF was used to train slot filling model with lexical feature of words, one-vs-all SVM with linear kernel (LinearSVMs) being used to train intent model with bag-of-words features of user input, e.g., typed and/or spoken queries and/or utterances, and the system action model utilized LinearSVMs as well but took as features one-hot vectors of aggregated user slot tags and intents. Thresholds of intent model and system action model were tuned on dev set, which were 0.225 and 0.162, respectively.

Pipeline (biLSTMs): conventionally separate NLU and SAP models were separately trained, and the pipelined for testing. Thresholds that were well-tuned on dev set for intent model and SAP model were 0.391 and 0.064.

Oracle (SVMs): LinearSVMs were trained with human annotated slot tags and intents, and tested with the same features on the test set. The best threshold for Oracle (SVMs) was 0.162.

Oracle (biLSTM): This SAP model was trained with human annotated slot tags and intents, and tested with the same features on the test set. The best threshold for Oracle (biLSTM) was 0.064.

As shown in Table 3, an end-to-end RNN for joint language understanding and dialogue management as described herein outperforms the other end-to-end models in frame-level accuracy by a large margin.

The JointModel (end-to-end RNN for joint language understanding and dialogue management as described herein) and Pipeline (biLSTMs) achieved absolute increases over Baseline (CRF+SVMs) with 15.13% and 4.25%, respectively. Both models beat the results of Oracle (SVMs). The Pipeline (biLSTMs) model performed worse than Oracle (biLSTM), which was as expected since Pipeline (biLSTMs) transfers errors from the NLU model to the SAP model. Nevertheless, the JointModel (end-to-end RNN for joint language understanding and dialogue management as described herein) obtains a 10.88% improvement over the Pipeline (biLSTMs) model and a 3.17% improvement over the Oracle (biLSTM) model. Thus joint training and modeling as described herein can mitigate the downside of traditional pipeline models based on hidden outputs from a history of NLUs capturing highly expressive feature representations that are lost in the conventional aggregation of user intents and slot tags. In comparison to the two Oracle models, the large improvement (12.02%) shown by the Oracle (biLSTM) model compared to the Oracle (SVMs) model indicates that the contextual user turns make significant contribution to system action prediction. In real human interaction scenarios, frame-level metrics are far more important than token-level metrics especially for multi-label classification tasks since predicting a precise number of labels is more challenging.

Illustrative Processes

Figure 5:
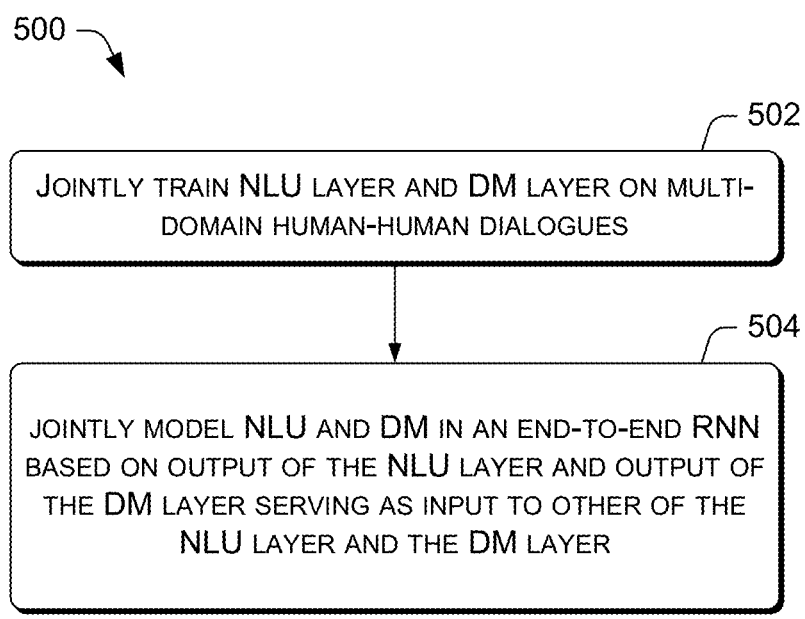
FIG. 5 is a flow diagram that illustrates example processes for training and operating an end-to-end recurrent neural network for joint language understanding and dialogue management according to various examples described herein.

FIG. 5 is a flow diagram that illustrates an example process 500 for training and operating computational models according to various examples described herein.

Figure 6:
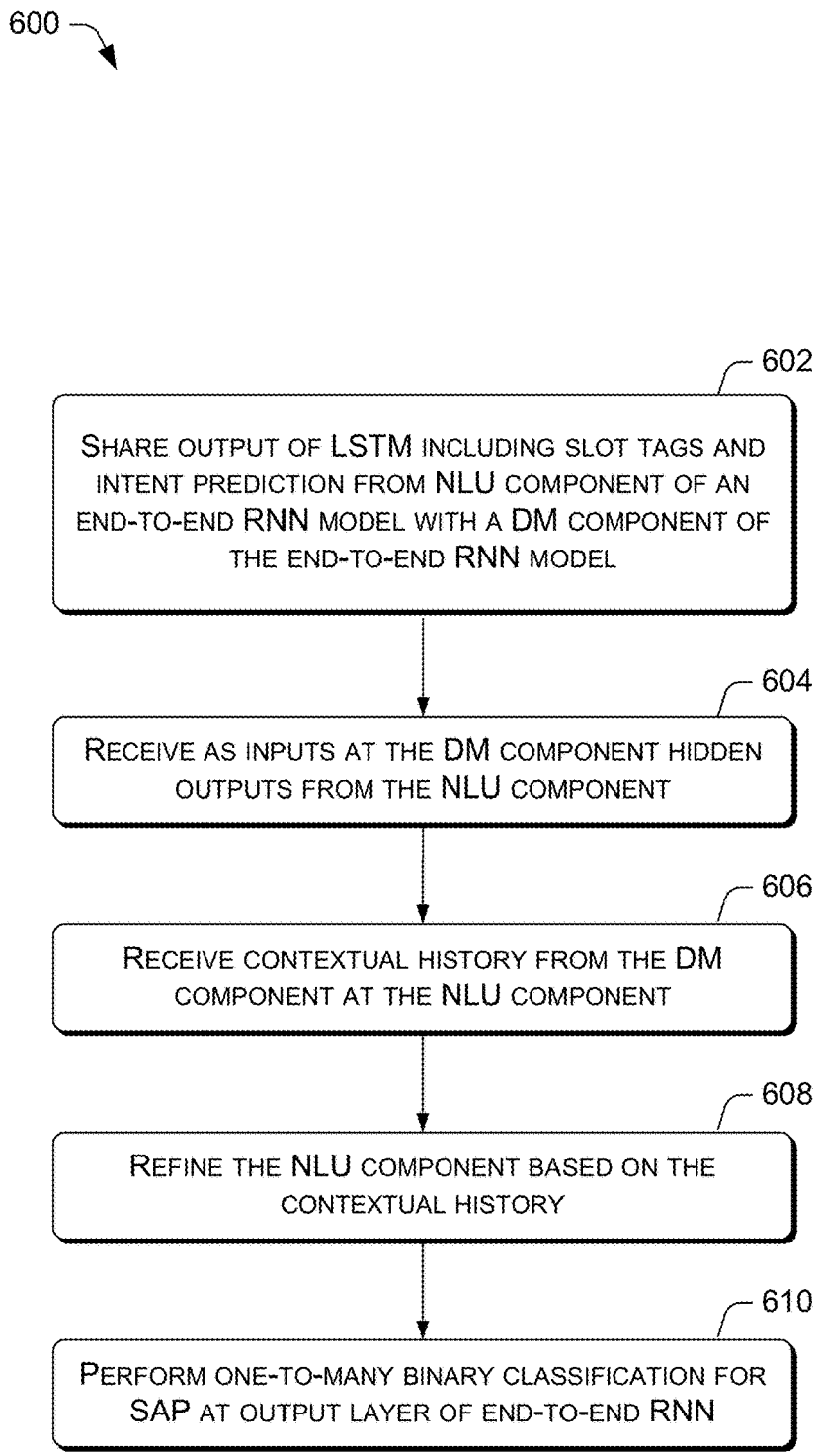
FIG. 6 is a flow diagram that illustrates example processes for operating an end-to-end recurrent neural network for joint language understanding and dialogue management according to various examples described herein.

Example functions shown in FIGS. 5 and 6 and example processes herein can be implemented by distributed computing resources 106 on and/or otherwise embodied in one or more computing device(s) 102 and/or 104, e.g., a computing device 200, e.g., using software running on such device(s). For the sake of illustration, the example process 500 is described below with reference to processing unit 202 and other components of computing device 200, FIG. 2, which can carry out and/or participate in the steps of the exemplary method. However, other processing unit(s) such as processing unit 112 and/or other components of computing device(s) 102 and/or 104 can carry out step(s) of described example processes such as process 500. Similarly, example method(s) shown in FIGS. 5 and 6 are also not limited to being carried out by any specifically-identified components.

The order in which the operations are described in each example flow diagram and/or process is not intended to be construed as a limitation, and any number of the described operations can be combined in any order and/or in parallel to implement each process. Moreover, the operations in each of FIGS. 5 and 6 can be implemented in hardware, software, and/or a combination thereof. In the context of software, the operations represent computer-executable instructions that, when executed by one or more processors, cause one or more processors to perform the recited operations. In the context of hardware, the operations represent logic functions implemented in circuitry, e.g., datapath-control and finite-state-machine sequencing functions.

At block 502, a system as described herein can jointly train a natural language understanding (NLU) component, part, or layer and a dialogue manager (DM) component, part, or layer of an end-to-end recurrent neural network (RNN) on multi-domain human-human dialogues.

At block 504, a system as described herein can jointly model NLU and dialogue management in the end-to-end RNN based on output of the NLU component, part, or layer and output of the DM component, part, or layer serving as input to other of the NLU component, part, or layer and the DM component, part, or layer.

For example, processor 202 can execute training engine 216 offline and/or joint language understanding and dialogue management engine 218 online on multiple turns of input in order to build an end-to-end memory network model 220. In various examples, the DM component, part, or layer can receive hidden output (and/or a history of hidden output) from the NLU component, part, or layer as input and the DM component, part, or layer can perform classification, in some examples binary classification, for system action prediction based at least on the hidden output. In some examples, the NLU component, part, or layer can receive as input, e.g., typed and/or spoken queries and/or utterances, and/or a sequence of word vectors, and the NLU component, part, or layer can estimate conditional probability to minimize distance between possible outputs for slot tagging, and/or can perform the classification for intent prediction. In various examples, the system can activate neurons of binary classifiers in an output layer of the end-to-end RNN using a sigmoid function. In some examples, the system can jointly train the end-to-end RNN model with a supervised signal of system action prediction. In some examples, the system can combine, e.g., aggregate, concatenate, etc., forward hidden output and backward output from an input vector and a reverse sequence of the input vector.

FIG. 6 is a flow diagram that illustrates example processes for operating an end-to-end recurrent neural network (RNN) for joint language understanding and dialogue management according to various examples described herein. The end-to-end RNN model can include a plurality of bi-directional long short-term memory (LSTM) cells, which can be configured to compute a sequence of hidden vectors and output a sequence of vectors according to calculations including a softmax for a vector representation of an input.

In some examples, at block 602, a system for implementing an end-to-end RNN as described herein can share output of LSTM including slot tags and intent prediction from an NLU component, part, or layer with a DM component, part, or layer. For example, processor 202 can execute training engine 216 offline and/or joint language understanding and dialogue management engine 218 online to share slot tags and intent prediction from an NLU component, part, or layer of an end-to-end memory network model 220 with a DM component, part, or layer of the end-to-end memory network model 220.

In some examples, at block 604, a system as described herein can receive as inputs at the DM component, part, or layer hidden outputs from the NLU component, part, or layer. For example, processor 202 can execute training engine 216 offline and/or joint language understanding and dialogue management engine 218 online to receive as inputs at a DM component, part, or layer of an end-to-end memory network model 220 hidden outputs from the NLU component, part, or layer of an end-to-end memory network model 220.

In some examples, at block 606, a system as described herein can receive as inputs at the NLU component, part, or layer contextual history from the NLU component, part, or layer. For example, processor 202 can execute training engine 216 offline and/or joint language understanding and dialogue management engine 218 online to receive as inputs at an NLU component, part, or layer of an end-to-end memory network model 220 contextual history from the DM component, part, or layer of an end-to-end memory network model 220.

In some examples, at block 608 a system as described herein can refine the NLU component, part, or layer based on the contextual history. For example, processor 202 can execute training engine 216 offline and/or joint language understanding and dialogue management engine 218 online to refine an NLU component, part, or layer of an end-to-end memory network model 220 with contextual history from the DM component, part, or layer of an end-to-end memory network model 220 that can include system action predictions, and error data related to system action prediction.

In some examples, at block 610 a system as described herein can perform one-to-many classification for system action prediction at an output layer of the end-to-end RNN.

For example, processor 202 can execute training engine 216 offline and/or joint language understanding and dialogue management engine 218 online to perform one-to-many binary classification for system action prediction at an output layer of the end-to-end RNN.

In various examples, a system as described herein can jointly train an end-to-end RNN model with a supervised signal of system action prediction, and in some instances with further supervised signals of slot tagging and/or intent prediction. In some examples, the system can apply an element-wise sigmoid function to neurons of the end-to-end RNN model. In various examples, a system as described herein can incorporate bi-directional weight matrices when combining forward hidden output and backward output from the input vector and the reverse sequence of the input vector.

EXAMPLE CLAUSES

1. A method comprising:
sharing output of bi-directional long short-term memory including slot tags and intent prediction from a natural language understanding (NLU) component of an end-to-end RNN model with a dialogue management (DM) component of the end-to-end RNN model;
receiving as inputs at the DM component hidden outputs from the NLU component; and
receiving contextual history at the NLU component from the DM component;
refining the NLU component based at least on the contextual history; and
performing one-to-many binary classification for system action prediction at an output layer of the end-to-end RNN model.

2. A method as clause 1 recites, further comprising jointly training the end-to-end RNN model with a supervised signal of system action prediction.

3. A method as clause 1 or 2 recites, further comprising identifying that the contextual history includes errors propagated from the DM component to the NLU component.

4. A method as any of clauses 1-3 recites, wherein the end-to-end RNN model includes a plurality of bi-directional long short-term memory (LSTM) cells.

5. A method as any of clauses 1-4 recites, further comprising computing a sequence of hidden vectors and output a sequence of vectors according to calculations including a softmax for a vector representation of an input, wherein in at least one example, a bi-directional LSTM cell of the bi-directional LSTM cells is configured to perform the computation.

6. A method as any of clauses 1-5 recites, further comprising applying an element-wise sigmoid function.

7. A method as any of clauses 1-6 recites, further comprising combining forward hidden output and backward output from an input vector and a reverse sequence of the input vector, wherein in at least one example, the bi-directional LSTM cells are configured to perform the combining.

8. A method as any of clauses 1-7 recites, further comprising incorporating bi-directional weight matrices when combining the forward hidden output and the backward output from the input vector and the reverse sequence of the input vector.

9. One or more computer-readable media coupled to one or more of the processing unit(s), the one or more computer-readable media having thereon one or more modules of computer-executable instructions to configure a computer to perform a method as any of clauses 1-8 recites.

10. A system comprising one or more processing unit(s); and one or more computer-readable media coupled to one or more of the processing unit(s), the one or more computer-readable media having thereon one or more modules of computer-executable instructions to configure a computer to perform a method as any of clauses 1-8 recites.

11. A method comprising:
jointly training on multi-domain human-human dialogues:
a natural language understanding (NLU) layer; and
a dialogue manager (DM) layer; and
jointly modeling NLU and dialogue management in an end-to-end recurrent neural network (RNN) based at least on output of the NLU layer and output of the DM layer serving as input to other of the NLU layer and the DM layer.

12. A method as clause 11 recites, further comprising:
receiving as input a hidden output from the NLU layer; and
performing classification for system action prediction based at least on the hidden output.

13. A method as clause 11 or 12 recites, wherein the NLU component receives as input a sequence of word vectors, and the NLU layer at least one of:
estimates conditional probability to minimize distance between possible outputs for slot tagging; or
performs classification for intent prediction.

14. A method as any of clauses 11-13 recites, further comprising performing binary classification.

15. A method as any of clauses 11-14 recites, further comprising activating neurons of binary classifiers in an output layer of the end-to-end RNN using a sigmoid function.

16. A method as any of clauses 11-15 recites, further comprising jointly training the end-to-end RNN model with a supervised signal of system action prediction.

17. A method as any of clauses 11-16 recites, wherein the NLU layer is configured to receive utterances as input.

18. A method as any of clauses 11-17 recites, further comprising combining forward hidden output and backward output from an input vector and a reverse sequence of the input vector.

19. One or more computer-readable media coupled to one or more of the processing unit(s), the one or more computer-readable media having thereon one or more modules of computer-executable instructions to configure a computer to perform a method as any of clauses 11-18 recites.

20. A system comprising one or more processing unit(s); and one or more computer-readable media coupled to one or more of the processing unit(s), the one or more computer-readable media having thereon one or more modules of computer-executable instructions to configure a computer to perform a method as any of clauses 11-18 recites.

21. A system comprising: one or more processing unit(s); and one or more computer-readable media coupled to one or more of the processing unit(s), the one or more computer-readable media including: an end-to end recurrent neural network (RNN) architecture operating as an aggregated model with limited contextual dialogue memory, the aggregated model limiting contextual dialogue memory by aggregating:
a natural language understanding (NLU) part; and
a dialogue management part.

22. A system as clause 21 recites, further comprising a training module configured to train the aggregated model with a supervised signal of system action prediction.

23. A system as clause 21 or 22 recites, wherein the end-to end RNN architecture includes a plurality of bi-directional long short-term memory (LSTM) cells configured to compute a sequence of hidden vectors and output a sequence of vectors according to calculations including a softmax for a vector representation of a current input.

24. A system as any of clauses 21-23 recites, wherein the end-to end RNN architecture includes a plurality of bi-directional long short-term memory (LSTM) cells configured to combine forward hidden output and backward output from an input vector and a reverse sequence of the input vector.

25. A system comprising: means for processing coupled to means for storing, the means for storing including:
  means for sharing output of bi-directional long short-term memory including slot tags and intent prediction from a natural language understanding (NLU) component of an end-to-end RNN model with a dialogue management (DM) component of the end-to-end RNN model;
  means for receiving as inputs at the DM component hidden outputs from the NLU component; and
  means for receiving contextual history at the NLU component from the DM component;
  means for refining the NLU component based at least on the contextual history; and
  means for performing one-to-many binary classification for system action prediction at an output layer of the end-to-end RNN model.

26. A system as clause 25 recites, further comprising means for jointly training the end-to-end RNN model with a supervised signal of system action prediction.

27. A system as clause 25 or 26 recites, further comprising means for identifying that the contextual history includes errors propagated from the DM component to the NLU component.

28. A system as any of clauses 25-27 recites, wherein the end-to-end RNN model includes a plurality of bi-directional long short-term memory (LSTM) cells.

29. A system as any of clauses 25-28 recites, further comprising means for computing a sequence of hidden vectors and means for outputting a sequence of vectors according to calculations including a softmax for a vector representation of an input, wherein in at least one example, a bi-directional LSTM cell of the bi-directional LSTM cells is configured to perform the computation.

30. A system as any of clauses 25-29 recites, further comprising means for applying an element-wise sigmoid function.

31. A system as any of clauses 25-30 recites, further comprising means for combining forward hidden output and backward output from an input vector and a reverse sequence of the input vector, wherein in at least one example, the bi-directional LSTM cells are configured to perform the combining.

32. A system as any of clauses 25-31 recites, further comprising means for incorporating bi-directional weight matrices when combining the forward hidden output and the backward output from the input vector and the reverse sequence of the input vector.

33. A system comprising: means for processing coupled to means for storing, the means for storing including:
  means for jointly training on multi-domain human-human dialogues:
    a natural language understanding (NLU) layer; and
    a dialogue manager (DM) layer; and
  means for jointly modeling NLU and dialogue management in an end-to-end recurrent neural network (RNN) based at least on output of the NLU layer and output of the DM layer serving as input to other of the NLU layer and the DM layer.

34. A system as clause 33 recites, further comprising:
  means for receiving as input a hidden output from the NLU layer; and
  means for performing classification for system action prediction based at least on the hidden output.

35. A system as clause 33 or 34 recites, wherein the NLU component comprises means for receiving as input a sequence of word vectors, and the NLU layer at least one of:
  means for estimating conditional probability to minimize distance between possible outputs for slot tagging; or
  means for performing classification for intent prediction.

36. A system as any of clauses 33-35 recites, further comprising means for performing binary classification.

37. A system as any of clauses 33-36 recites, further comprising means for activating neurons of binary classifiers in an output layer of the end-to-end RNN using a sigmoid function.

38. A system as any of clauses 33-37 recites, further comprising means for jointly training the end-to-end RNN model with a supervised signal of system action prediction.

39. A system as any of clauses 33-38 recites, further comprising means for receiving utterances as input, wherein in at least one example the NLU layer is configured to receive the utterances.

40. A system as any of clauses 33-39 recites, further comprising means for combining forward hidden output and backward output from an input vector and a reverse sequence of the input vector.

41. A system comprising: means for processing; and means for storing coupled to means for processing, the means for storing including: means for operating as an aggregated model with limited contextual dialogue memory, the aggregated model limiting contextual dialogue memory by means for aggregating:
  a natural language understanding (NLU) part; and
  a dialogue management part.

42. A system as clause 41 recites, further comprising means for training the aggregated model with a supervised signal of system action prediction.

43. A system as clause 41 or 42 recites, further comprising means for computing a sequence of hidden vectors and means for outputting a sequence of vectors according to calculations including a softmax for a vector representation of a current input, wherein in at least one example, the end-to end RNN architecture includes a plurality of bi-directional long short-term memory (LSTM) cells configured to perform the computing and outputing.

44. A system as any of clauses 41-43 recites, further comprising means for combining forward hidden output and backward output from an input vector and a reverse sequence of the input vector, wherein in at least one example the end-to end RNN architecture includes a plurality of bi-directional long short-term memory (LSTM) cells configured to perform the combining.

CONCLUSION

Although the techniques have been described in language specific to structural features and/or methodological acts, it is to be understood that the appended claims are not necessarily limited to the features and/or acts described. Rather, the features and acts are described as example implementations of such techniques. For example, network 108, processing unit(s) 112/134/202, and other structures described herein for which multiple types of implementing devices or structures are listed can include any of the listed types, and/or multiples and/or combinations thereof.

The operations of the example processes are illustrated in individual blocks and summarized with reference to those blocks. The processes are illustrated as logical flows of blocks, each block of which can represent one or more operations that can be implemented in hardware, software, and/or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions and/or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing device(s) 102, 104, and/or 200 such as one or more internal and/or external CPUs and/or GPUs, and/or one or more pieces of hardware logic such as FPGAs, DSPs, and/or other types described above.

All of the methods and processes described above can be embodied in, and fully automated via, software code modules executed by one or more general purpose computers and/or processors. The code modules can be stored in any type of computer-readable storage medium and/or other computer storage device. Some and/or all of the methods can be embodied in specialized computer hardware.

Conditional language such as, among others, "can," "could," "might" and/or "may," unless specifically stated otherwise, are understood within the context to present that certain examples include, while other examples need not include, certain features, elements and/or steps. Thus, such conditional language is not generally intended to imply that certain features, elements and/or steps are in any way required for one or more examples and/or that one or more examples necessarily include logic for deciding, with and/or without user input and/or prompting, whether certain features, elements and/or steps are included and/or are to be performed in any particular example. The word "or" is used herein in an inclusive sense unless specifically stated otherwise. Accordingly, conjunctive language such as the phrases "X, Y, or Z" or "at least one of X, Y or Z," unless specifically stated otherwise, is to be understood as signifying that an item, term, etc., can be either X, Y, or Z, or a combination thereof.

Any routine descriptions, elements and/or blocks in the flow diagrams described herein and/or depicted in the attached figures should be understood as potentially representing modules, segments, and/or portions of code that include one or more executable instructions for implementing specific logical functions and/or elements in the routine. Alternative implementations are included within the scope of the examples described herein in which elements and/or functions can be deleted and/or executed out of order from any order shown or discussed, including substantially synchronously and/or in reverse order, depending on the functionality involved as would be understood by those skilled in the art. It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim or clause is a reference to at least some of the items in the group of items, unless specifically stated otherwise.

What is claimed is:

1. A system comprising:
   one or more processing unit(s);
   one or more computer-readable media coupled to one or more of the processing unit(s), the one or more computer-readable media having thereon one or more modules of computer-executable instructions to configure a computer to perform operations of an end-to-end recurrent neural network (RNN) model, the operations comprising:
   sharing output of bi-directional long short-term memory including slot tags and intent predictions from a natural language understanding (NLU) component of the end-to-end RNN model with a dialogue management (DM) component of the end-to-end RNN model;
   receiving as inputs at the DM component hidden outputs including slot tags and intent predictions from the NLU component;
   receiving contextual history at the NLU component from the DM component;
   refining the NLU component based at least on the contextual history;
   and generating a system action prediction at an output layer of the end-to-end RNN model utilizing at least one one-to-many binary classification based on the inputs, wherein the binary classification is obtained using an activation function operating on a combination of forward hidden output as well as backward output.

2. A system as claim 1 recites, wherein the end-to-end RNN model includes a plurality of bi-directional long short-term memory (LSTM) cells.

3. A system as claim 2 recites, wherein the bi-directional LSTM cells are configured to combine forward hidden output and backward output from an input vector and a reverse sequence of the input vector.

4. A system as claim 3 recites, the one or more computer-readable media having thereon one or more modules of computer-executable instructions to configure the computer to perform operations further comprising incorporating bi-directional weight matrices when combining the forward hidden output and the backward output from the input vector and the reverse sequence of the input vector.

5. A system as claim 2 recites, wherein a bi-directional LSTM cell of the bi-directional LSTM cells is configured to compute a sequence of hidden vectors and output a sequence of vectors according to calculations including a softmax for a vector representation of an input.

6. A system as claim 1 recites, the one or more computer-readable media having thereon one or more modules of computer-executable instructions to configure the computer to perform operations further comprising jointly training the end-to-end RNN model with a supervised signal of system action prediction.

7. A system as claim 1 recites, wherein the contextual history includes errors propagated from the DM component to the NLU component.

8. A system as claim 1 recites, the one or more computer-readable media having thereon one or more modules of computer-executable instructions to configure the computer to perform operations further comprising applying an element-wise sigmoid function.

9. A method comprising:
jointly training on multi-domain human-human dialogues:
a natural language understanding (NLU) layer; and
a dialogue manager (DM) layer; and
jointly modeling NLU and dialogue management in an end-to-end recurrent neural network (RNN) based at least on output of the NLU layer and output of the DM layer serving as input to the other of the NLU layer and the DM layer, wherein jointly modeling includes:
receiving as inputs at the DM layer, a hidden output from the NLU layer including slot tags and intent predictions, and
generating a system action prediction at an output layer of the end-to-end RNN utilizing at least one one-to-many binary classification based on the inputs, wherein the binary classification is obtained using an activation function operating on a combination of forward hidden output as well as backward output.

10. A method as claim 9 recites, wherein the NLU component receives as input a sequence of word vectors, and the NLU layer at least one of:
estimates conditional probability to minimize distance between possible outputs for slot tagging; or
performs classification for intent prediction.

11. A method as claim 9 recites, further comprising activating neurons of binary classifiers in an output layer of the end-to-end RNN using a sigmoid function.

12. A method as claim 9 recites, further comprising jointly training the end-to-end RNN model with a supervised signal of system action prediction.

13. A method as claim 9 recites, wherein the NLU layer is configured to receive utterances as input.

14. A method as claim 9 recites, further comprising combining forward hidden output and backward output from an input vector and a reverse sequence of the input vector.

15. A system comprising:
one or more processing unit(s);
one or more computer-readable media coupled to one or more of the processing unit(s), the one or more computer-readable media including:
an end-to end recurrent neural network (RNN) architecture operating as an aggregated model with limited contextual dialogue memory, the aggregated model limiting contextual dialogue memory by aggregating:
a natural language understanding (NLU) part;
and a dialogue management (DM) part, wherein the DM part receives as inputs, hidden outputs from the NLU part, and a system action prediction at an output layer of the end-to-end RNN model utilizes at least one one-to-many binary classification based on the inputs, wherein the binary classification is obtained using an activation function operating on a combination of forward hidden output as well as backward output.

16. A system as claim 15 recites, further comprising a training module to train the aggregated model with a supervised signal of system action prediction.

17. A system as claim 15 recites, wherein the end-to end RNN architecture includes a plurality of bi-directional long short-term memory (LSTM) cells configured to compute a sequence of hidden vectors and output a sequence of vectors according to calculations including a softmax for a vector representation of a current input.

18. A system as claim 15 recites, wherein the end-to end RNN architecture includes a plurality of bi-directional long short-term memory (LSTM) cells configured to combine forward hidden output and backward output from an input vector and a reverse sequence of the input vector.

* * * * *